US012028694B2

(12) United States Patent
Chiu et al.

(10) Patent No.: US 12,028,694 B2
(45) Date of Patent: Jul. 2, 2024

(54) PLANAR DIAPHRAGM SPEAKER

(71) Applicant: TIINLAB CORPORATION, Shenzhen (CN)

(72) Inventors: Shihchia Chiu, Shenzhen (CN); Anqi Li, Shenzhen (CN)

(73) Assignee: TIINLAB CORPORATION, Shenzhen (CN)

( * ) Notice: Subject to any disclaimer, the term of this patent is extended or adjusted under 35 U.S.C. 154(b) by 204 days.

(21) Appl. No.: 17/821,803

(22) Filed: Aug. 24, 2022

(65) Prior Publication Data

US 2023/0124537 A1 Apr. 20, 2023

(30) Foreign Application Priority Data

Oct. 18, 2021 (CN) ........................ 202111209409.0

(51) Int. Cl.
*H04R 7/04* (2006.01)
*H04R 9/02* (2006.01)

(52) U.S. Cl.
CPC ............... *H04R 7/04* (2013.01); *H04R 9/025* (2013.01)

(58) Field of Classification Search
CPC ................................. H04R 7/94; H04R 9/025
USPC ........................................................ 381/431
See application file for complete search history.

(56) References Cited

U.S. PATENT DOCUMENTS 5,953,438 A * 9/1999 Stevenson .............. H04R 9/047 381/431
2016/0345099 A1* 11/2016 Bushko .................. H04R 9/025
2018/0279968 A1* 10/2018 Boyd ....................... A61B 7/04

FOREIGN PATENT DOCUMENTS

CN 114915882 A * 8/2022 ........... H04R 1/1075

* cited by examiner

*Primary Examiner* — Sean H Nguyen
(74) *Attorney, Agent, or Firm* — Andrew C. Cheng

(57) ABSTRACT

A planar diaphragm speaker includes an enclosure, a vibration diaphragm assembly, and two magnet assemblies fixed in the enclosure. The vibration diaphragm assembly is arranged between the two magnet assemblies and spaced from the two magnet assemblies. The magnet assemblies each include a ring-shaped outer magnet and an inner magnet with a magnetic gap formed therebetween. The vibration diaphragm assembly includes a vibration diaphragm and a voice coil. The vibration diaphragm is formed with a trough. An effective-width portion of the voice coil spans over the magnetic gap. The planar diaphragm speaker with a simple structure can effectively increase the thickness of the voice coil without increasing a vibration compartment height, and provide, through collaboration with a dual-side magnetic circuit structure, a 360° dead zone free magnetic field to enhance the sensitivity and low frequency performance of the planar diaphragm speaker, exhibiting excellent utilization.

15 Claims, 6 Drawing Sheets

PLANAR DIAPHRAGM SPEAKER

FIELD OF THE INVENTION

The present invention relates to the technical field of speakers, and more particularly to a planar diaphragm speaker.

DESCRIPTION OF THE RELATED ART

Planar magnetic technology is also known as orthodynamic technology, which is a miniaturized planer loudspeaker, in which magnets are concentrated on one side or two sides of a diaphragm and the diaphragm oscillates in a magnetic field generated thereby. Compared to the moving coil technology, the planar magnetic technology exhibits better performance in high frequencies.

In the known technology, a small-sized planar diaphragm speaker is generally formed of a single-side magnetic circuit together with an odd number, such as three or five, of magnets. This does not provide a 360-degree dead zone free magnetic field. As a result, the small-sized planar diaphragm speaker is poorer than the moving coil technology in respect to speaker sensitivity.

SUMMARY OF THE INVENTION

In view of the above, the present invention provides a planar diaphragm speaker, which effectively resolves the problems of the known technology that a small-sized planar diaphragm speaker cannot fulfil a 360-degree dead zone free magnetic field and shows a relatively low magnetic field intensity and low sensitivity.

The present invention provides a planar diaphragm speaker, which comprises an enclosure, a vibration diaphragm assembly, and two magnet assemblies. The two magnet assemblies are both fixed inside the enclosure. The vibration diaphragm assembly is located between the two magnet assemblies and arranged to be spaced from the two magnet assemblies. Each of the magnet assemblies comprises an inner magnet and a ring-shaped outer magnet surrounding the inner magnet with a magnetic gap being formed between an outer side surface of the inner magnet and an inner side surface of the outer magnet. The vibration diaphragm assembly comprises vibration diaphragm and a voice coil, the vibration diaphragm being formed with a trough. An effective-width portion of the voice coil spans over the magnetic gap, a width of the effective-width portion being greater than or equal to a width of the magnetic gap.

In some embodiments, a depth of the trough is ½ of a thickness of the voice coil.

In some embodiments, a magnetic polarity of one end of the inner magnet that is adjacent to the vibration diaphragm assembly is opposite to that of one end that is distant from the vibration diaphragm assembly, and a magnetic polarity of one end of the outer magnet that is adjacent to the vibration diaphragm assembly is opposite to that of one end that is distant from the vibration diaphragm assembly.

In some embodiments, for a same one of the magnet assemblies, magnetic polarities of ends of the inner magnet and the outer magnet that are adjacent to the vibration diaphragm assembly are opposite; and for different ones of the magnet assemblies, magnetic polarities of ends of the outer magnets that are adjacent to the vibration diaphragm assembly are identical, and for different ones of the magnet assemblies, magnetic polarities of ends of the inner magnets that are adjacent to the vibration diaphragm assembly are identical.

In some embodiments, the film is formed, in one end thereof that is close to an adjacent one of the magnet assemblies, in an integrated form, with a bent ring, and the bent ring projects in a direction that is identical a direction in which the trough is recessed.

In some embodiments, the vibration diaphragm divides an internal space of the enclosure into a front compartment space and a rear compartment space; a pad is arranged in the front compartment space; the pad comprises a top face and a bottom face that are opposite to each other and a lateral face connecting between the top face and the bottom face. The top face is positioned against an internal surface of the enclosure, the lateral face being arranged to separate from the internal wall surface of the enclosure, the bottom face being simultaneously in contact engagement with the inner magnet and the outer magnet adjacent thereto.

In some embodiments, the pad does not completely block the magnetic gap, so that the magnetic gap is in communication with a space between the lateral face of the pad and the internal wall surface of the enclosure.

In some embodiments, a length of the pad is less than an inside diameter of the outer magnet, and a width of the pad is greater than the inside diameter of the outer magnet.

In some embodiments, a sidewall of the enclosure is formed with a front-compartment sound outlet opening in communication with the front compartment space, the front-compartment sound outlet opening being arranged at one side of the pad and not blocked by the magnet assemblies.

In some embodiments, the sidewall of the enclosure is formed with a rear-compartment sound outlet opening in communication with the rear compartment space.

In some embodiments, the enclosure comprises a top wall and a bottom wall that are opposite to each other and a sidewall connecting between the top portion and the bottom wall. The sidewall comprises two opposite long-side sidewalls and two opposite short-side sidewalls, each of the long-side sidewalls being connected to the two short-side sidewalls adjacent thereto, lengthwise dimensions of the long-side sidewalls being greater than widthwise dimensions of the short-side sidewalls, height-wise dimensions of the long-side sidewalls being equal to height-wise dimensions of the short-side sidewalls.

In some embodiments, the vibration diaphragm assembly is parallel to the top wall and are perpendicular to the four sidewalls; and the front-compartment sound outlet opening and the rear-compartment sound outlet opening are respectively formed in the two opposite short-side sidewalls.

In some embodiments, the inner magnet is in the form of a strip, and the magnetic gap is greater than or equal to 0.05 mm and is less than or equal to 0.15 mm.

In some embodiments, the vibration diaphragm comprises a film, a rigid plate, and film ring that are arranged to sequentially stack on each other, and the trough is formed in the rigid plate; and the voice coil and the film ring are located on a same side of the rigid plate.

In some embodiments, a gap between the voice coil and an adjacent one of the magnet assemblies is greater than or equal to 0.1 mm and less than or equal to 0.2 mm.

The present invention provides improvements to the drawbacks of known medium and small sized planar diaphragm for being incapable of providing a 360° dead zone free magnetic field and the magnetic field being of a low intensity and having a poor sensitivity, and specifically realizes the following beneficial efficacy:

(1) Magnet assemblies comprising an inner magnet and a ring-shaped outer magnet are provided and two of such the magnet assemblies are arranged on two opposite axial sides of a vibration diaphragm assembly to form a closed-loop dual-sized magnetic circuit structure, which forms a 360° all-directional dead zone free magnetic field around the vibration diaphragm assembly so as to enhance the sensitivity of the speaker.

(2) A trough is formed in a vibration diaphragm of the vibration diaphragm assembly and a voice coil is disposed in the trough, so that, without increasing a vibration compartment height, the thickness of the voice coil can be effectively increased to further enhance the speaker sensitivity and also to better position the voice coil, and also to allow an effective-width portion of the voice coil to span over a magnetic gap to ensure that the voice coil is located in the most intense part of the magnetic field to further enhance the sensitivity of the speaker.

(3) Under a condition of ensuring accurate positioning of the outer magnet and the inner magnet, a pad that has a small size is arranged in combination with a front-compartment sound outlet opening of which the location is close to an upper side to enhance low frequency performance.

(4) A bent ring is arranged in the film to enhance low frequency performance and the rigid plate and the trough form a dome-like structure to further enhance high frequency performance.

The planar diaphragm speaker according to the present invention has a simple structure and can effectively increase the thickness of the voice coil without increasing a vibration compartment height and a device overall size, and provides, through collaboration with a dual-side magnetic circuit structure, a 360° dead zone free magnetic field to enhance the sensitivity and low frequency performance of the planar diaphragm speaker, exhibiting excellent utilization.

BRIEF DESCRIPTION OF THE DRAWINGS

To more clearly illustrate the technical solutions presented in the embodiments of the present invention, the following provides a brief description to the drawings that are essential for the illustration of technical solutions presented in the embodiments or those of the prior art. It is obvious that the drawings of which the description provided below are just for some of the embodiments of the present invention, and for those having ordinary skill in the art, other drawings can be contemplated from theses without paying creative endeavor.

DETAILED DESCRIPTION OF PREFERRED EMBODIMENTS OF THE INVENTION

Figure 1:
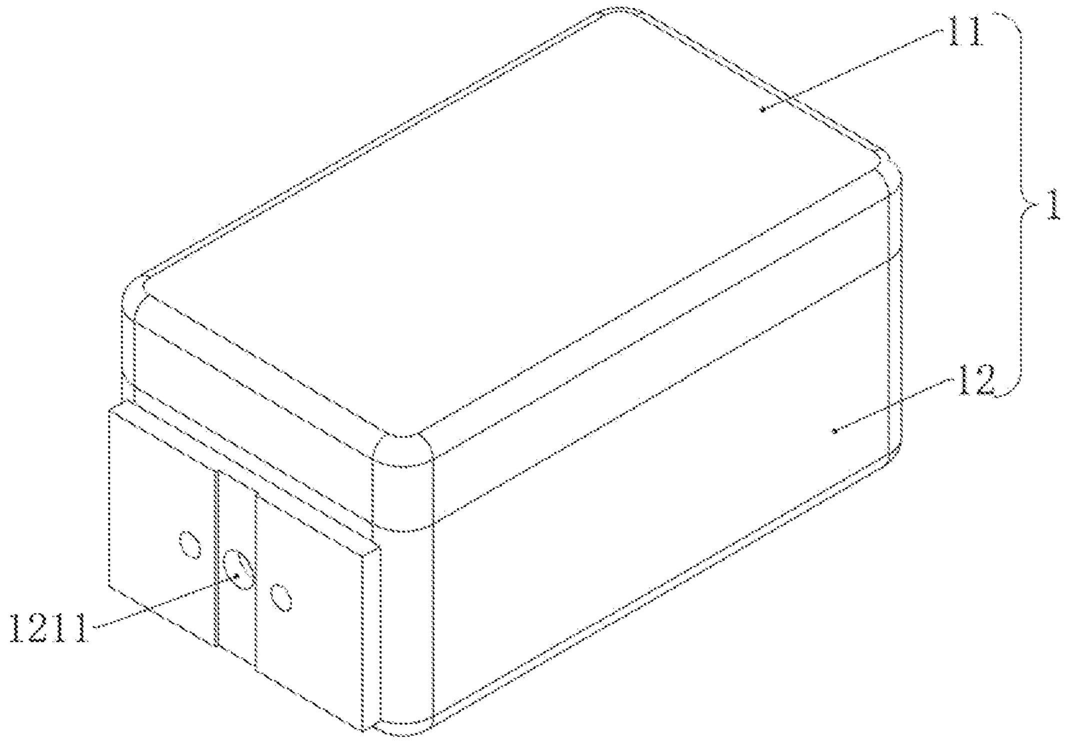
FIG. 1 is a perspective view showing, in a schematic form, a planar diaphragm speaker according to an embodiment of the present invention.

For better understanding of the objectives, the technical solutions, and the advantages of the present invention, the following provides a more detailed description of the present invention with reference to the embodiments of the present invention and the drawings. It is appreciated that the embodiments described herein are provided only for illustration of the present invention and are not intended to impose limitation to the present invention.

It is noted that, in the following description, the terms, such as "length", "width", "top", and "bottom", which are provided to indicate orientation or positional relationship indicates such orientation or positional relationship as shown in the drawings and are provided for illustration of the present invention and for simplifying the illustration, and are not intended to indicate or suggest that an indicated device or component must involve a specific orientation or position, or must be constructed or operated in a specific orientation or position, and should not be interpreted as limiting to the present invention.

Further, the terms "first", "second", and the likes are provided for illustration only and should not be construed as indicating or suggesting relative importance or implying the quantity of the specific technical feature so indicated. Thus, a technical feature that is identified as being "first" or "second" may involve an explicit indication or an implication of including a single one or a plurality of such features. In the description of the present invention, "plurality" indicates two or more than two, unless a clear description is provided to the contrary.

To expound the technical solutions of the present invention, a description is provided below with reference to the attached drawings and embodiments.

As a first embodiment, the instant embodiment provides a planar diaphragm speaker, in which, guaranteeing the speaker being miniature without an increase of the size thereof, an arrangement of a magnetic field is so made as to realize a 360° omnidirectional dead zone-free magnetic field so as to enhance the sensitivity of the speaker.

Figure 3:
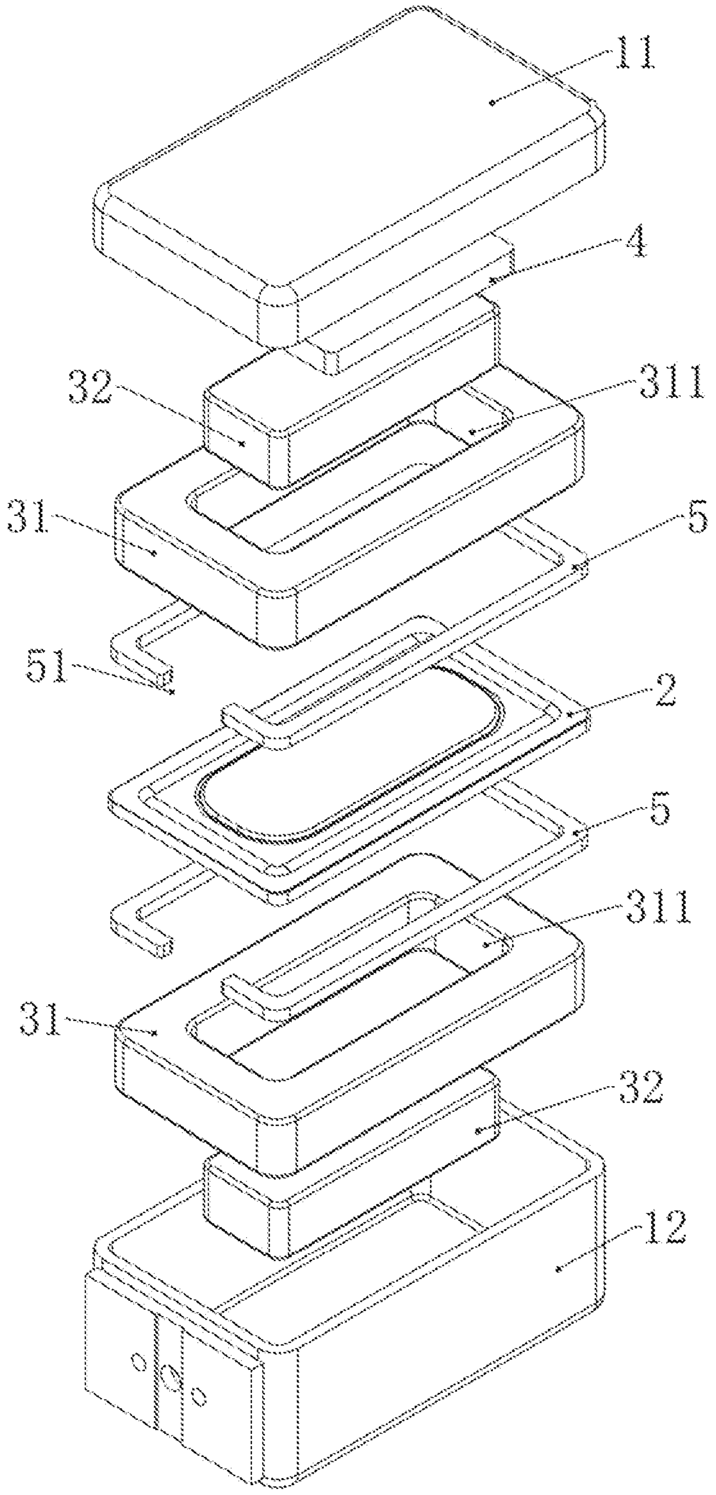
FIG. 3 is an exploded view showing, in a schematic form, the planar diaphragm speaker according to the embodiment of the present invention.
Figure 5:
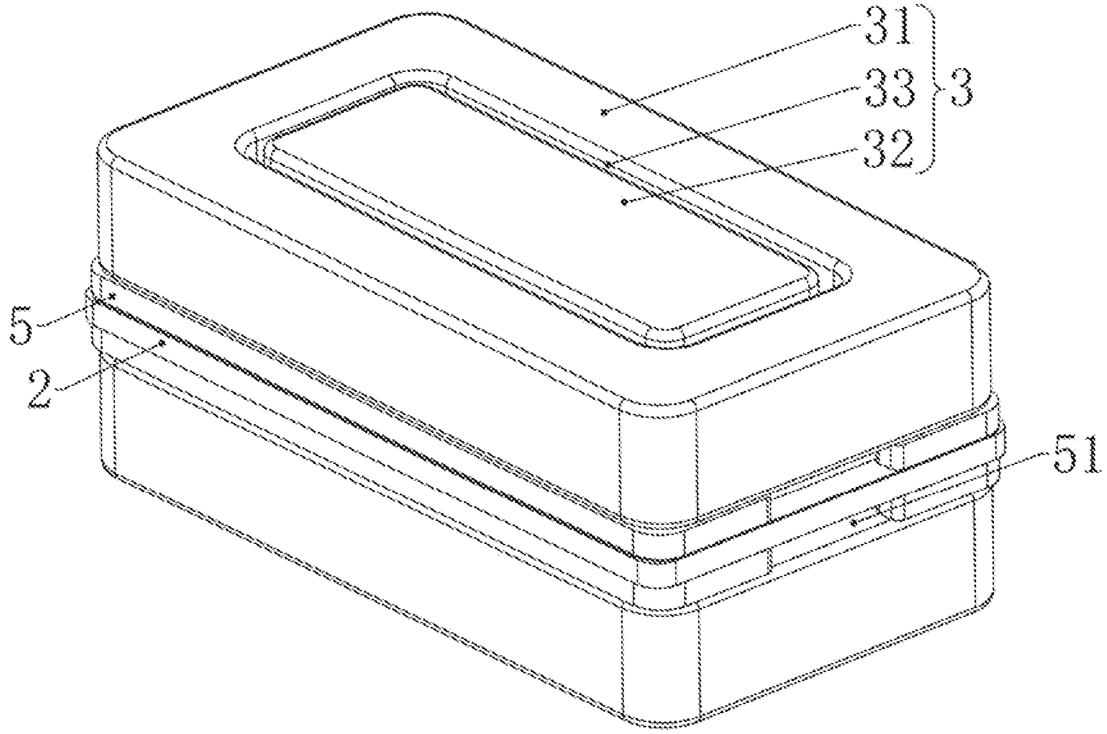
FIG. 5 is a perspective view, in a schematic form, showing the planar diaphragm speaker shown in FIG. 1, with an enclosure and a pad removed.

Referring to FIGS. 1, 3, and 5, the planar diaphragm speaker provided in the instant embodiment comprises an enclosure 1, a vibration diaphragm assembly 2, and two magnet assemblies 3. The enclosure 1 functions as a mounting base for the subsequently described structure. The enclosure 1 is a hollow casing and the subsequently described structure is entirely received in the enclosure 1.

The magnet assembly 3 comprises an outer magnet 31 and an inner magnet 32. The outer magnet 31 is a ring-shaped magnet. The inner magnet 32 is disposed inside the outer magnet 31. A gap is arranged between an outside surface of the inner magnet 32 and an inside surface of the outer magnet 31. The gap will be referred to as a magnetic gap 33. Specifically, since the outer magnet 31 is a ring-shaped magnet, a through hole 311 is formed in an interior thereof, and the inner magnet 32 is disposed in the through hole 311. A space between the outside surface of the inner magnet 32 and the inside surface of the outer magnet 31 forms the magnetic gap 33. The inner magnet 32 is so disposed in the through hole 311 as to collaborate with the outer magnet 31 to form a 360° closed-loop internal/external magnetic field structure without dead zone, which helps increase an electromagnetic force so as to ensure a wider range of vibration frequency for the vibration diaphragm assembly 2, and providing the planar diaphragm speaker with higher sensitivity.

An external surface of the outer magnet 31 and an internal surface of the enclosure 1 are set in tight engagement with each other. A shape of the outer magnet 31 is conformed with a shape of the enclosure 1. The outer magnet 31 can be a magnet in the form of a rectangular loop or a magnet in the form of a circular loop.

It is noted that the outer magnet 31 is a ring-shaped magnet, and the term "ring-shaped magnet" used herein indicates a central portion of the outer magnet 31 is formed with an internal hole penetrating therethrough. The internal hole functions to receive the inner magnet 32 to dispose therein, and the magnetic gap 33 is formed between the outer side surface of the inner magnet 32 and the inner side surface of the outer magnet 31. The application imposes no specific limitation to the shape of the internal hole, and the hole can be a circle, a rectangle, a square, or a corner-rounded rectangle. The term "ring-shape magnet" used herein should not be construed as constraining the shape of the outer magnet 31 to be a circular ring, and in fact, the application imposes no specific limitation to the shape of the outer magnet 31. A projection of an outer contour of the outer magnet 31 can be a circle, a rectangle, a square, or a corner-rounded rectangle. Further, in the instant embodiment, no specific limitation is applied to the shape of the inner magnet 32.

The vibration diaphragm assembly 2 is disposed between the two magnet assemblies 3, and magnetic poles of surfaces facing each other of the two magnet assemblies 3 mutually repel each other. The magnet assemblies 3 are arranged on top and bottom sides of the vibration diaphragm assembly 2 to form double-side closed-loop magnetic circuit to further enhance the electromagnetic force and further improve the sensitivity of the planar diaphragm speaker.

Referring to FIGS. 3, 7, 8, and 9, the vibration diaphragm assembly 2 comprises a vibration diaphragm 21 and a voice coil 22. The voice coil 22 is connected to the vibration diaphragm 21. The voice coil 22, after being supplied with electrical power, drives the vibration diaphragm 21 to vibrate between the two magnet assemblies 3 as being acted upon by the closed-loop internal/external magnetic fields. An effective-width portion of the voice coil 22 spans over the magnetic gap 33, and a width of the effective-width portion is greater than or equal to a width of the magnetic gap 33. Referring to FIG. 10, the voice coil 22 is of a loop-like shape and is formed, in a central portion thereof, with a through hole penetrating therethrough. The effective-width portion of the voice coil 22 indicates the physical width of voice coil with the through hole penetrating through the central portion being excluded. Such an arrangement ensures the voice coil 22 is located in the most intense portion of the magnetic field of the magnet assembly 3, and also ensure that the voice coil 22 does not fall into the magnetic gap 33 during the operation of the vibration diaphragm assembly 2.

Figure 8:
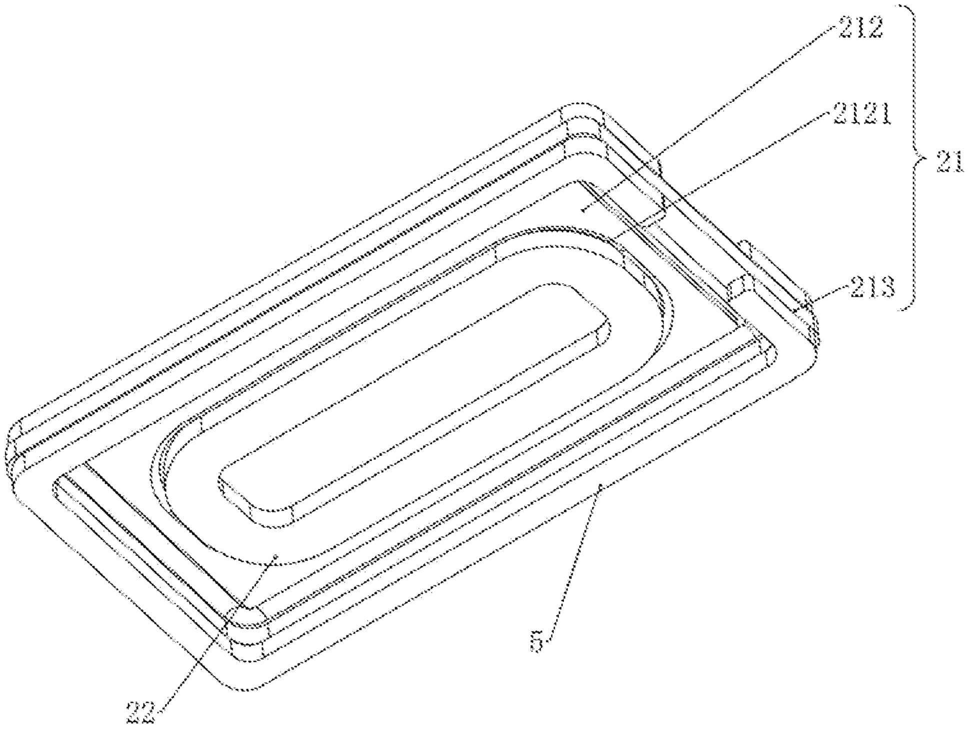
FIG. 8 is another perspective view, in a schematic form, showing the vibration diaphragm assembly of the planar diaphragm speaker shown in FIG. 1.
Figure 9:
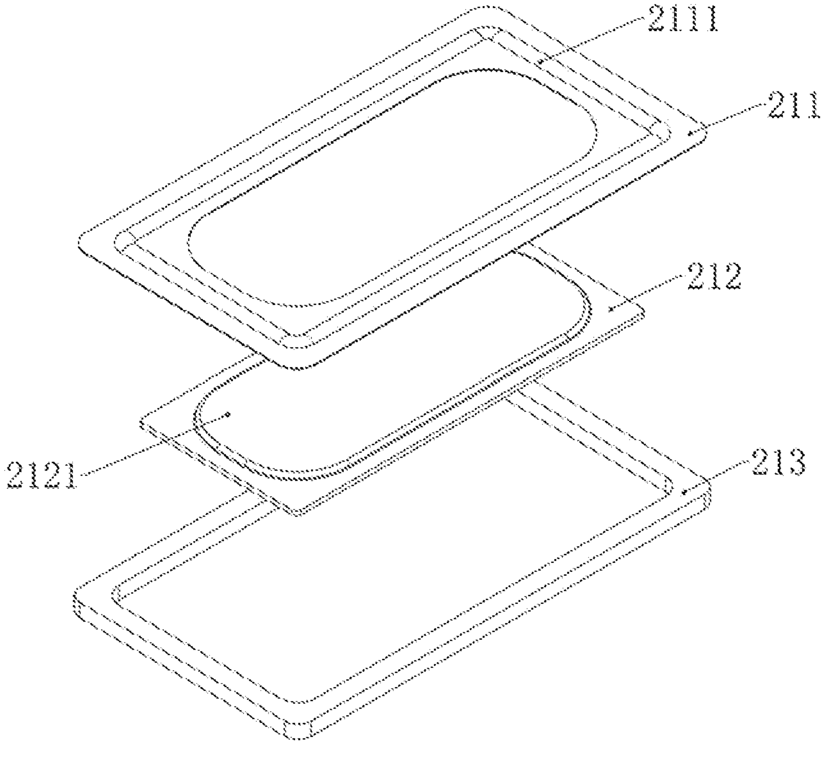
FIG. 9 is an exploded view, in a schematic form, showing a vibration diaphragm of the planar diaphragm speaker shown in FIG. 1.
Figure 10:
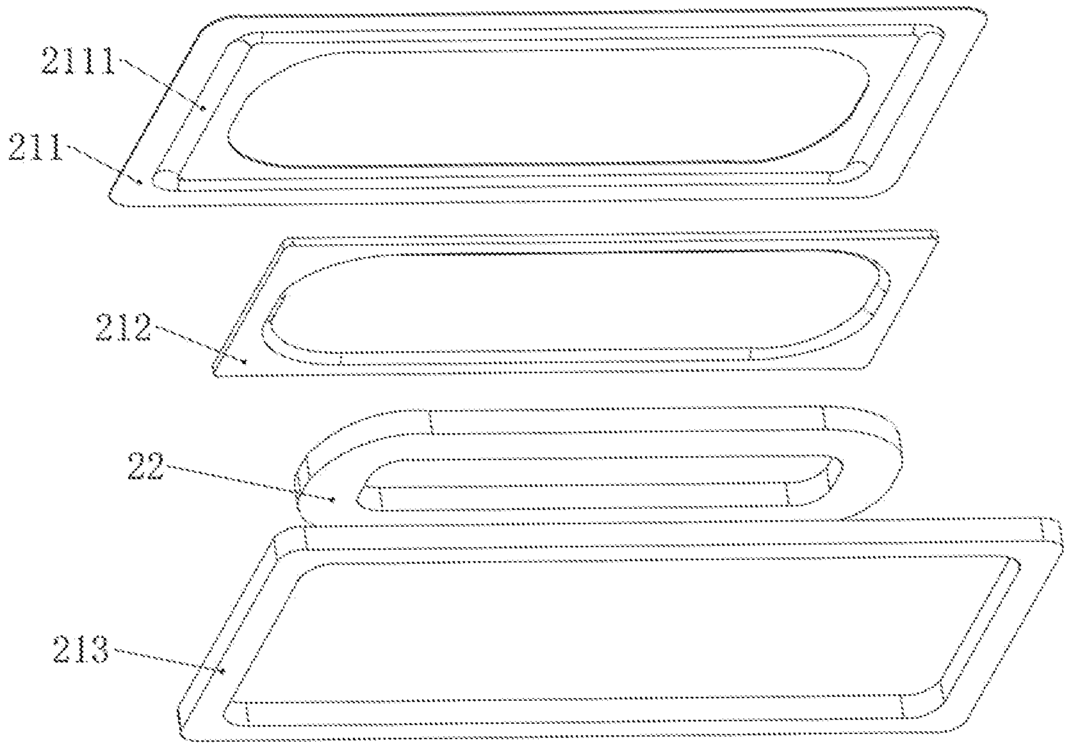
FIG. 10 is another exploded view, in a schematic form, showing the vibration diaphragm of the planar diaphragm speaker shown in FIG. 1.
Figure 11:
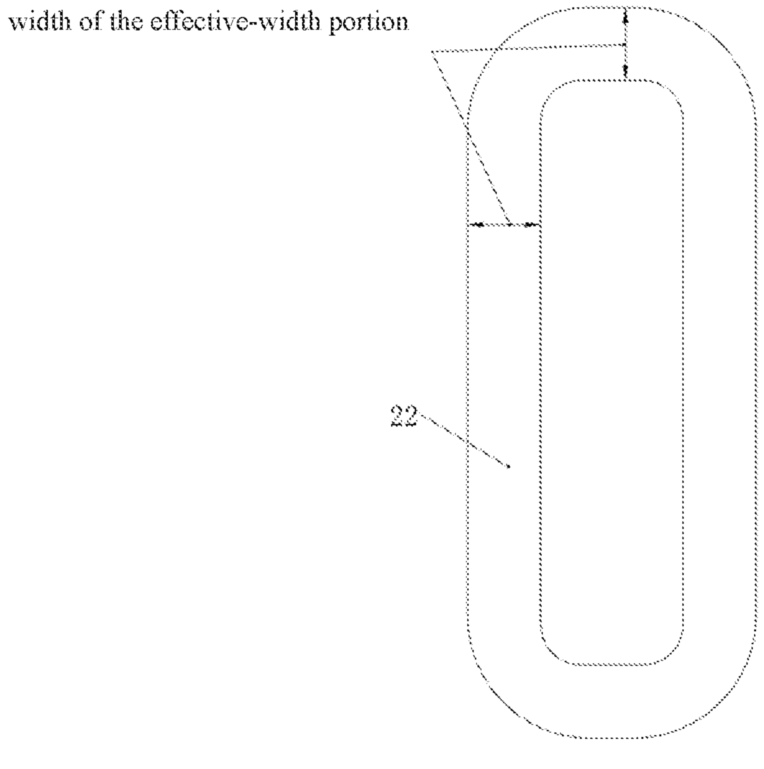
FIG. 11 is a front view, in a schematic form, showing a voice coil of the planar diaphragm speaker shown in FIG. 1.

Referring to FIGS. 8, 9, and 11, the voice coil 22 is a single-hole ring-shaped voice coil, and the voice coil 22 is of a shape similar to an ellipse. The hole formed in the central portion of the voice coil 22 is a rectangular hole for easy of machining. If the width of the effective-width portion of the voice coil 22 is smaller than the width of the magnetic gap 33, or the effective-width portion of the voice coil 22 does not span over the magnetic gap 33, then an electromotive force induced between the voice coil 22 and the magnet assembly 3 is reduced, affecting the vibration frequency of the vibration diaphragm assembly 2, so as to lower the sensitivity of the speaker.

The vibration diaphragm 21 comprises a film 211 and a rigid plate 212 stacked together. The rigid plate 212 is formed with a trough 2121, and the voice coil 22 is fixed in the trough 2121, such that a portion of the voice coil 22 is located in the trough 2121, while another portion is located outside the trough 2121, meaning in a thickness direction, a portion of the voice coil 22 is located in the trough 2121 and another portion is outside of the trough 2121. Compared to a rigid plate that is in the form of a flat board without trough, under the condition that a vibration compartment height remains identical, the thickness of the voice coil 22 fixed in the trough 2121 of the rigid plate 212 can be significantly increased, where the increased thickness is the depth of the trough 2121. A thickened voice coil 22 can firstly generate a stronger magnetic force between the voice coil 22 and the magnetic field, and secondly, the thickened voice coil 22 is hard to deform during machining, so as to reduce the difficulty of machining.

Further, a top/bottom surface area of the outer magnet 31 is identical to a top/bottom surface area of the vibration diaphragm assembly 2, in order to ensure that the closed-loop internal/external magnetic field structure so formed can completely cover and shield the vibration diaphragm assembly 2, thereby ensuring the entirety of the vibration diaphragm assembly 2 is located within the effective magnetic field.

Further, four lateral surfaces of the outer magnet 31 and four lateral surfaces of the vibration diaphragm assembly 2 are all set in contact engagement with the internal wall surface of the enclosure 1, in order to realize high utilization of the magnetic field and space.

In the above-described structure, the film 211 can be made of a material that is similar to that used to make a film of a known moving-coil speaker, and can be for example paper, ceramic, polypropylene, and wood, or can be other film materials commonly used in moving-coil speakers. The rigid plate 212 can be made of a material of metal, or plastics or fibers, and a metallic material is preferred. The metallic material is relatively thin and light in weight, while showing a relatively high strength, allowing for increase of high frequency and also for easy mounting of the voice coil 22 in the trough 2121. The trough 2121 is formed by means of stamping and, meanwhile, the voice coil 22 may be modified according to the size and shape of the magnetic circuit. The size of the trough 2121 corresponds to the voice coil 22.

In the above-described structure, under the condition that the height of the vibration compartment between the two magnet assemblies 3 remains the same, arranging the trough 2121 in the vibration diaphragm 21 helps increase the receiving space for the voice coil 22, allowing the thickness of the voice coil 22 to be increased to thereby enhance the speaker sensitivity.

In the instant embodiment, the ring-shaped outer magnet 31 and the inner magnet 32 are arranged collaboratively to form the closed-loop internal/external magnetic field structure, forming a 360° dead zone free closed-loop internal/external magnetic field. The arrangement of the closed-loop internal/external magnetic field structure on both top and bottom sides of the vibration diaphragm assembly 2 forms a double-sized closed-loop magnetic circuit that significantly increases the electromagnetic force, increases the vibration frequency of the vibration diaphragm assembly 2, and thus enhances the sensitivity of the planar diaphragm speaker.

Referring to FIGS. 8 and 10, in one embodiment, one half of the thickness of the voice coil 22 is received inside the trough 2121, meaning the thickness of the voice coil 22 is double of that of the trough 2121. Such an arrangement allows the two opposite axial ends of the voice coil 22 to be spaced from two adjacent axial ends of the magnet assemblies 3 by substantially the same distance in order to ensure that upward and downward amplitudes of vibration of the vibration diaphragm 211 can be substantially identical. A lead-out line and a lead-in line of the voice coil 22 are both connected to the film ring 213, and are thus connected to an external circuit.

Figure 2:
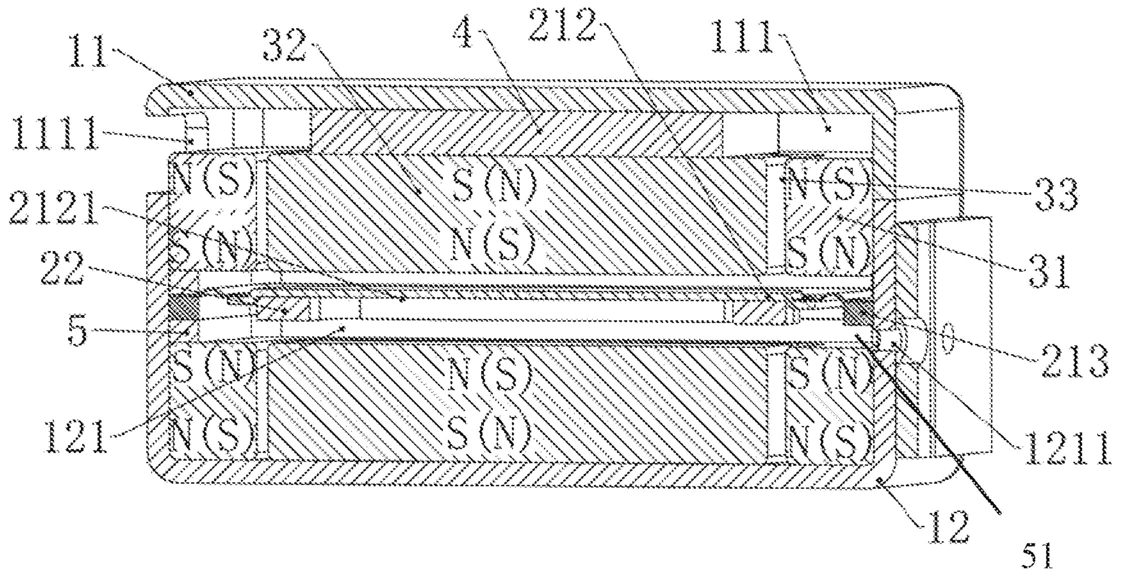
FIG. 2 is a cross-sectional view showing, in a schematic form, the planar diaphragm speaker according to the embodiment of the present invention.

Referring to FIG. 2, in one embodiment, for a same one of the magnet assemblies, corresponding ends of the inner magnet 32 and the outer magnet 31 are of magnetic polarities that are opposite, for example, when the upper end of the inner magnet 32 is a S-pole, the upper end of the outer magnet 33 is a N-pole; when the upper end of the inner magnet 32 is a N-pole, the upper end of the outer magnet 33 is a S-pole. For different ones of the magnet assemblies 3, corresponding ends of the inner magnet 32 and the outer magnet 31 are of magnetic polarities that are identical. Such an arrangement ensure that the force applied to the voice coil 22 in the closed-loop internal/external magnetic field is uniform and the direction of force is identical ubiquitously, so that the magnetic force applied to the voice coil 22 is doubled to thereby greatly enhance the sensitivity of the speaker.

The following two arrangements may be present in the instant embodiment:

In the first one, the inner magnet 32 and the outer magnet 31 are polarized axially, ends of the inner magnet 32 and the outer magnet 31 of one of the magnet assemblies 3 that face the vibration diaphragm assembly 2 are set as an N pole and an S pole, respectively, while ends of the inner magnet 32 and the outer magnet 31 of the other one of the magnet assemblies 3 that face the vibration diaphragm assembly 2 are similarly set as an N pole and an S pole, respectively.

In the second one, which is exactly opposite to the first one, ends of the inner magnet 32 and the outer magnet 31 of one of the magnet assemblies 3 that face the vibration diaphragm assembly 2 are set as an S pole and an N pole, respectively, while ends of the inner magnet 32 and the outer magnet 31 of the other one of the magnet assemblies 3 that face the vibration diaphragm assembly 2 are similarly set as an S pole and an N pole, respectively.

Referring to FIG. 2, in one embodiment, a gap between the voice coil 22 and one of the magnet assemblies 3 adjacent thereto is greater than or equal to 0.1 mm and less than or equal to 0.2 mm. Specifically, the gap between the voice coil 22 and the adjacent one of the magnet assemblies 3 is the distance from a bottom surface of the voice coil 22 to the magnet assembly 3, and the gap between the voice coil 22 and the adjacent one of the magnet assemblies 3 is also the distance from a top surface of the voice coil 22 to the magnet assembly 3. Such a distance is so arranged as to preserve a sufficient amount of space for upward and downward vibration of the vibration diaphragm 21, so as to provide a proper distance between the voice coil 22 and the magnet assemblies 3 to ensure the sensitivity of the speaker, and also to prevent noise resulting from the vibration diaphragm 21 impacting the magnet assemblies 3 during the vibration thereof.

Referring to FIG. 2, in one embodiment, the magnetic gap 33 between each lateral side of the inner magnet 32 and a corresponding portion of the internal side surface of the outer magnet 31 is made identical, and the magnetic gap 33 is greater than or equal to 0.05 mm and less than or equal to 0.15 mm. Such an extremely small magnetic gap 33, in combination with the closed-loop internal/external magnetic field structure, helps realize an even greater electromagnetic force and expands the vibration frequency range of the vibration diaphragm assembly 2, to thereby enhance the sensitivity of the speaker.

Referring to FIGS. 1 and 2, in one embodiment, the vibration diaphragm 21 divides an internal space of the enclosure 1 into a front compartment space 111 and a rear compartment space 121. A pad 4 is arranged in the front compartment space 111. The arrangement of the pad 4 makes the front compartment space 111 enlarged, so as to enhance low frequency performance of the planar diaphragm speaker and also to better fix the magnet assembly 3 in the enclosure 1.

Figure 4:
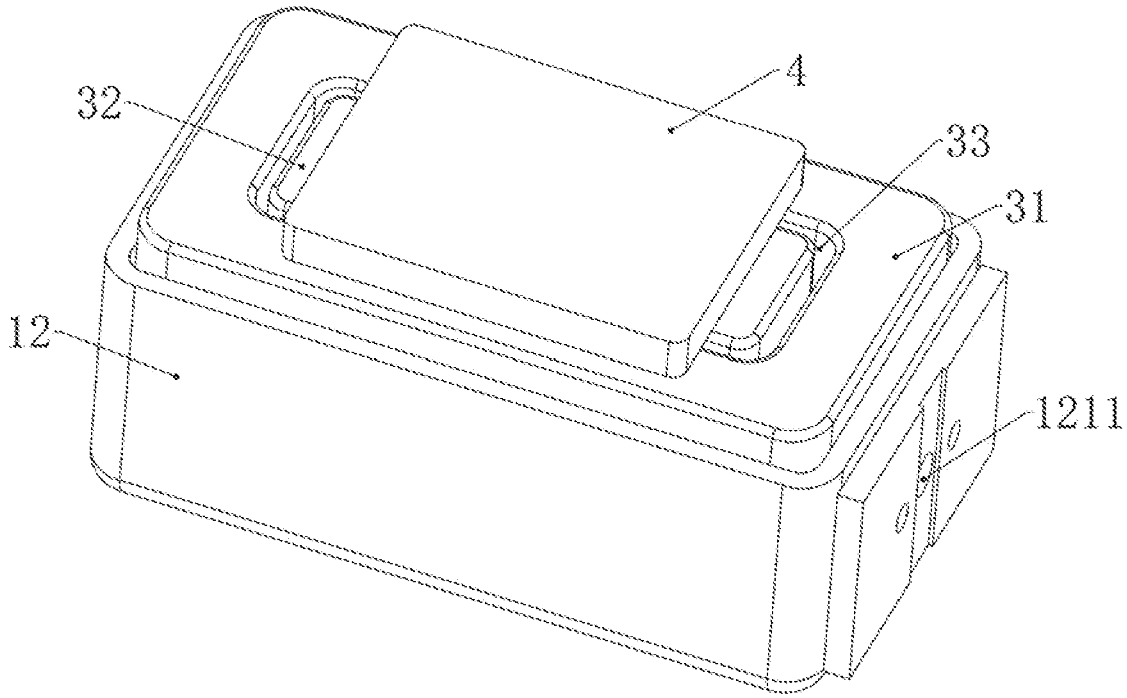
FIG. 4 is a perspective view, in a schematic form, showing the planar diaphragm speaker shown in FIG. 1, with a top cover removed.

Referring to FIGS. 2, 3, and 4, the pad 4 comprises a top face and a bottom face that are opposite to each other and a lateral face connecting between the top face and the bottom face. The top face is positioned against the internal surface of the enclosure 1. The lateral face is arranged to separate from the internal side surface of the enclosure 1. The bottom face is simultaneously in contact with the inner magnet 32 and the outer magnet 31 adjacent thereto, in order to ensure that ends of the inner magnet 31 and the outer magnet 32 are in flush with each other. The pad 4 covers only a portion of the magnetic gap 33 that is adjacent thereto and does not cover the entirety of the magnetic gap 33, so that the magnetic gap 33 adjacent thereto is allowed to communicate with the space between the lateral face of the pad 4 and the internal wall surface of the enclosure 1. Such a space between the lateral face of the pad 4 and the internal side surface of the enclosure 1 is a ring-shaped communication space formed between the lateral face of the pad 4 and the internal side surface of the enclosure 1.

The front compartment space 111 is a space between the vibration diaphragm 21 and the internal surface of the enclosure 1, which specifically comprises a space between an end face of the vibration diaphragm 21 and an end face of one of the magnet assemblies 3 adjacent thereto, a corresponding one of the magnetic gaps 33, and a space between the lateral face of the pad 4 and the internal side surface of the enclosure 1. Two ends of the magnetic gap 33 are respectively in communication with the space between the one end of the vibration diaphragm 21 and the one end of the adjacent magnet assembly 3 and the space between the lateral face of the pad 4 and the internal side surface of the enclosure 1, so that the front compartment space 111 is formed as one continuous and integrated space.

The rear compartment space 121 is a space between the vibration diaphragm 21 and the internal surface of the enclosure 1, which specifically comprises a space between an opposite end face of the vibration diaphragm 21 and an end face of one of the magnet assemblies 3 adjacent thereto, and a corresponding one of the magnetic gaps 33. The magnetic gap 33 is in communication with the space between the opposite end of the vibration diaphragm 21 and the end face of the adjacent magnet assembly 3, and makes the rear compartment space 121 one continuous and integrated space.

Referring to FIG. 4, in one embodiment, a length of the pad 4 is less than an inside diameter of the outer magnet 31, and a width of the pad 4 is greater than the inside diameter of the outer magnet 31. Specifically, in case that the outer magnet 31 is a circular ring-shaped magnet and the internal hole in the central portion of the ring-shaped outer magnet 31 is a circular hole, the length of the pad 4 is less than the inside diameter of the outer magnet 31 and the width of the pad 4 is greater than an outside diameter of the outer magnet 31.

Referring to FIG. 4, there also exits a feasible arrangement that the outer magnet 31 is a rectangular ring-shaped magnet.

The inner magnet 32 is a magnet having a form of a strip. In view of the outer magnet 31 being a ring-shaped magnet and being made to correspond to the inner magnet 32 and further in view of a uniform width of the magnetic gap 33, the central internal through hole of the outer magnet 31 is similarly a rectangular hole.

The width of the pad 4 is greater than the width of the central internal hole of the outer magnet 31, and the length of the pad 4 is less than the length of the inner magnet 32.

Figure 6:
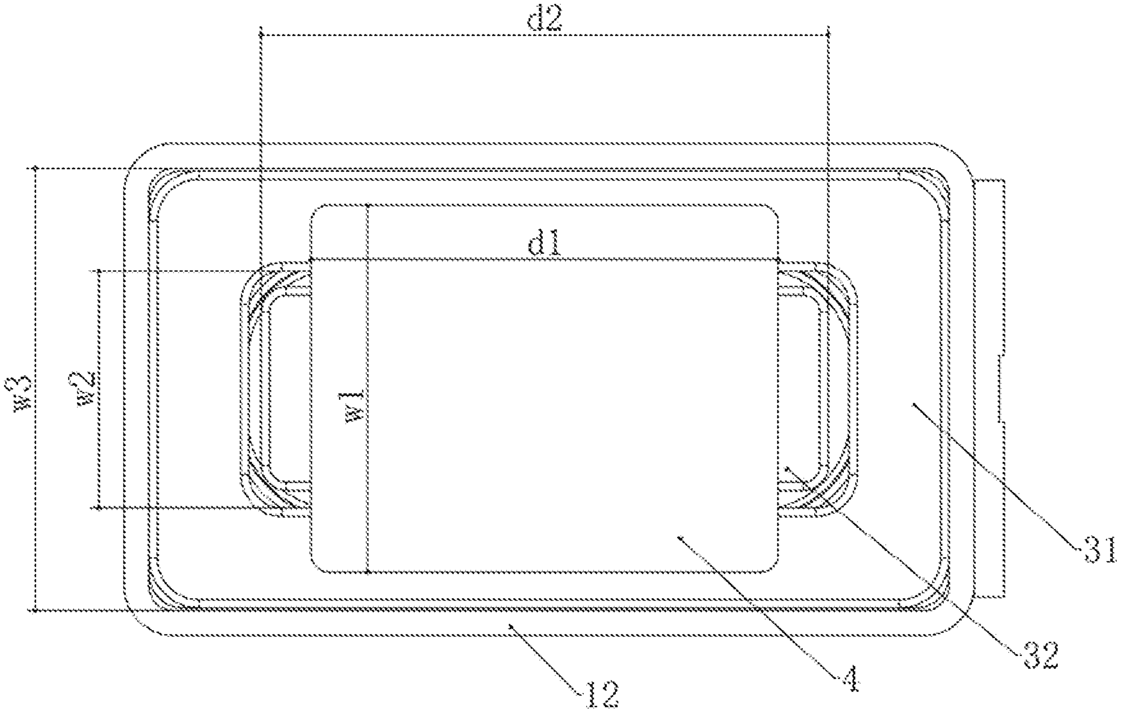
FIG. 6 is a top plan view, in a schematic form, showing the planar diaphragm speaker shown in FIG. 1, with the enclosure and the pad removed.

Specifically, referring to FIG. 6, in the drawing, "d1" indicates the length of the pad 4; "w1" indicates the width of the pad 4; "d2" indicates the length of the inner magnet 32; "w2" indicates the width of the central internal through hole of the outer magnet 31; "w3" indicate the width of the outer magnet 31, wherein the length "d1" of the pad 4 is less than or equal to the length "d2" of the inner magnet 32; the width "w1" of the pad 4 is greater than the width "w2" of the central internal through hole, and the width "w1" of the pad 4 is less than the width "w3" of the outer magnet 31. The length "d1" of the pad 4 being less than the length "d2" of the inner magnet 32 ensures that the pad 4 does not block the front compartment space 111 and thus ensuring the integrity and continuity of the front compartment space 111.

The above-described arrangement provides a primary purpose of making a length-to-width ratio of the pad 4 relatively small so that the shape of the pad 4 is a rectangle that is closer to a square, but not close to an elongate strip. Such an arrangement is for easiness of machining and also for easiness for the pad 4 to fix the adjacent one of the magnet assemblies 3, and also for expanding the volume of the front compartment space 111 to ensure low frequency performance.

Referring to FIGS. 1 and 2, in one embodiment, the sidewall of the enclosure 1 is formed with a front-compartment sound outlet opening 1111 and a rear-compartment sound outlet opening 1211. The front-compartment sound outlet opening 1111 is in communication with the front compartment space 111, and the rear-compartment sound outlet opening 1211 is in communication with the rear compartment space 121. The front-compartment sound outlet opening 1111 faces toward a sound outlet opening of a sound nozzle of the planar diaphragm speaker, meaning the front-compartment sound outlet opening 1111 faces toward a sound outlet end of an earphone.

Referring to FIGS. 1 and 2, the enclosure 1 comprises a top wall and a bottom wall that are opposite to each other and a sidewall connecting between the top wall and the bottom wall. The sidewall includes two opposite long-side sidewalls and two opposite short-side sidewalls. Each of the long-side sidewalls is connected to the two short-side sidewalls adjacent thereto. Lengthwise dimensions of the long-side sidewalls are greater than widthwise dimensions of the short-side sidewalls and height-wise dimensions of the long-side sidewalls are equal to height-wise dimensions of the short-side sidewalls, meaning the enclosure 1 is a hollow rectangular parallelepiped box, and the vibration diaphragm assembly 2 is parallel to the top wall and is perpendicular to the four sidewalls.

The front-compartment sound outlet opening 1111 and the rear-compartment sound outlet opening 1211 are respectively defined in the two short-side sidewalls. Since the sound outlet channel in the earphone sound nozzle is an elongate passage, when the speaker is disposed in the sound outlet channel, such an arrangement makes the lengthwise direction of the enclosure 1 be parallel to an extension direction of the sound outlet channel, so as to ensure that the enclosure 1 and the sound outlet channel correspond to each other in respect of shape. Such an arrangement ensures the short-side sidewall in which the front-compartment sound outlet opening 1111 is arranged faces toward a sound outlet direction of the sound outlet channel of the earphone, making the front-compartment sound outlet opening 1111 in direct communication with the sound outlet channel of the earphone and the sound generated by the speaker being allowed to directly transmit to the sound outlet opening of the sound nozzle by way of the front-compartment sound outlet opening 1111 to ensure the sound quality.

Figure 7:
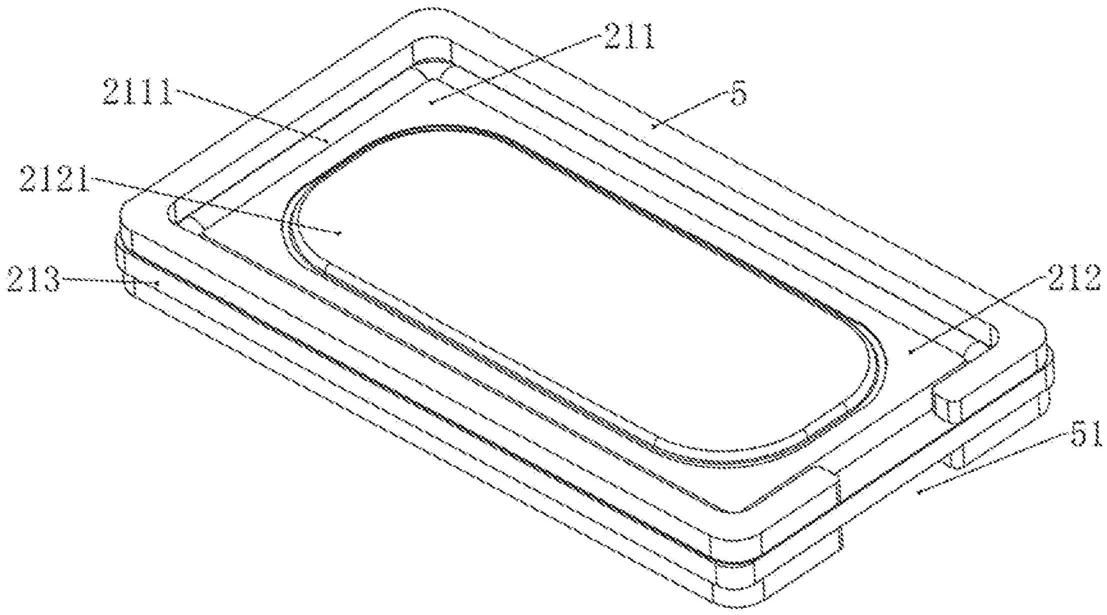
FIG. 7 is a perspective view, in a schematic form, showing a vibration diaphragm assembly of the planar diaphragm speaker shown in FIG. 1.

Referring to FIGS. 3, 5, and 7, in one embodiment, a gasket ring 5 is arranged between the vibration diaphragm assembly 2 and each of the magnet assemblies 3 adjacent thereto. The arrangement of the gasket ring 5 allows for a tight compression engagement along a periphery of the vibration diaphragm assembly 2 to better fix the vibration diaphragm assembly 2 between the two magnet assemblies 3. The thickness of the two gasket rings 5 plus with the thickness of the film ring 213 define a height of the vibration compartment.

Referring to FIGS. 8 and 9, in one embodiment, the film 211 is formed, in an end thereof that is close to an adjacent one of the magnet assemblies 3, in an integrated form, with a bent ring 2111. A projecting direction of the bent ring 2111 is the same as a projecting direction of the trough 2121. The arrangement of the bent ring 2111 helps improve the low frequency performance of the device and also enhances stiffness of the film 211 in a radial direction to fulfill an effect of conducting axial vibration of the vibration diaphragm assembly 2. The bent ring 2111, collaborating with the gasket rings 5, realizes airtightness and prevents occurrence of opposite sound waves. The bent ring 2111 itself functions as damping to reduce resonance and reflection.

Referring to FIG. 2, in one embodiment, the front-compartment sound outlet opening 1111 and the rear-compartment sound outlet opening 1211 are respectively arranged in two opposite sidewalls of the enclosure 1.

Referring to FIGS. 2, 5, 7, and 8, in one embodiment, the rear-compartment sound outlet opening 1211 is arranged at one side of the gasket ring 5, and the gasket ring 5 is formed with a notch 51 to allow the rear-compartment sound outlet opening 1211 not to be blocked and to be in communication with the rear compartment space 121.

Referring to FIG. 2, in one embodiment, the front-compartment sound outlet opening 1111 is arranged at one side of the pad 4, and the front-compartment sound outlet opening 1111 is in communication with the front compartment space 111 in an un-blocked manner. By means of the pad 4, the volume of the front compartment space 111 is expanded, and the low frequency performance is enhanced, and the front-compartment sound outlet opening 1111, which is not blocked, may present better transmission of sound effect.

The front-compartment sound outlet opening 1111 is arranged in the sidewall of the enclosure 1 and distant from the vibration diaphragm 21, and the front-compartment sound outlet opening 1111 is correspondingly in communication with a space around the pad 4, so as to ensure complete transmission of low frequency sound effect by the front-compartment sound outlet opening 1111 can be fulfilled in a better way. The front-compartment sound outlet opening 1111 being arranged in the short sidewall of the enclosure 1 facilitates the front-compartment sound outlet opening 1111 to align with the extension direction of the sound outlet tube of the earphone for direct transmission of sound effect. If the front-compartment sound outlet opening 1111 is formed in the top surface of the enclosure, it is not possible to make the front-compartment sound outlet opening 1111 directly orientate toward the extension direction of the sound outlet tube of the earphone, making it not possible to completely and directly transmit the sound effect so as to affect the sound quality.

Referring to FIGS. 8, 9, and 10, in one embodiment, the vibration diaphragm 21 comprises the film 211, the rigid plate 212, and the film ring 213 that arranged to sequentially stack on each other. The film 211 and the film ring 213 are respectively set adjacent to the magnet assemblies 3, and the rigid plate 212 is disposed between the film 211 and the film ring 213. The film ring 213 is configured to support the rigid plate 212 and the film 211. The rigid plate 212 is configured to ensure high frequency performance. The film 211 is configured to ensure low frequency performance.

Referring to FIG. 9, the rigid plate 212 is formed with the trough 2121, such that the trough 2121 projects toward one side of the film 211. The film 211 is of a ring shape and is attached to the projecting side of the trough 2121. The film 211 is adhesively attached to the rigid plate 212. The voice coil 22 is adhesively attached in the trough 2121. The film ring 213 is arranged on the same side as the voice coil 22 and is bonded to the rigid plate 212.

In one embodiment, the enclosure 1 comprises a top cover 11 and a bottom shell 12. The bottom shell 12 receives all the components/parts described above. The top cover 11 is set on and covers the bottom shell 12. Such an arrangement eases dismantling and replacing the components/parts. A space between an internal surface of the top cover 11 and the pad 4 forms a part of the front compartment, and the front-compartment sound outlet opening 1111 is formed in a side wall/surface of the top cover 11 to prevent the front-compartment sound outlet opening 1111 from being blocked by the magnet assembly 3 to thereby ensure better low frequency performance of the device.

The above embodiments are provided only to explain the technical solution of the present invention and are not for constraining. Although a detailed description has been made with reference to the above embodiments, those having ordinary skill in the art may appreciate that it is possible to make modifications to the technical solution disclosed in each of the above embodiments, or to make equivalent substitute for some of the technical features thereof. Such modifications or substitutes do not make the essences of the corresponding technical solutions depart from the spirit and scope of the technical solutions provided in each of the embodiments of the present invention and are included in the scope of protection covered by the claims of the present invention.

What is claimed is:

1. A planar diaphragm speaker, comprising an enclosure (1), a vibration diaphragm assembly (2), and two magnet assemblies (3);

the two magnet assemblies (3) being both fixed inside the enclosure (1), the vibration diaphragm assembly (2) being located between the two magnet assemblies (3) and being arranged to be spaced from the two magnet assemblies (3);

the magnet assembly (3) comprising an inner magnet (32) and a ring-shaped outer magnet (31) surrounding the inner magnet (32), a magnetic gap (33) being formed between an outer side surface of the inner magnet (32) and an inner side surface of the outer magnet (31);

the vibration diaphragm assembly (2) comprising a vibration diaphragm (21) and a voice coil (22), the vibration diaphragm (21) being formed with a trough (2121);

the voice coil (22) being fixed in the trough (2121), an effective-width portion of the voice coil (22) spanning over the magnetic gap (33), a width of the effective-width portion being greater than or equal to a width of the magnetic gap (33).

2. The planar diaphragm speaker according to claim 1, wherein a depth of the trough (2121) is less than or equal to ½ of a thickness of the voice coil (22).

3. The planar diaphragm speaker according to claim 1, wherein a magnetic polarity of one end of the inner magnet (32) that is adjacent to the vibration diaphragm assembly (2) is opposite to that of one end that is distant from the vibration diaphragm assembly (2), and a magnetic polarity of one end of the outer magnet (31) that is adjacent to the vibration diaphragm assembly (2) is opposite to that of one end that is distant from the vibration diaphragm assembly (2).

4. The planar diaphragm speaker according to claim 1, wherein for a same one of the magnet assemblies (3), magnetic polarities of ends of the inner magnet (32) and the outer magnet (31) that are adjacent to the vibration diaphragm assembly (2) are opposite; and for different ones of the magnet assemblies (3), magnetic polarities of ends of the outer magnets (31) that are adjacent to the vibration diaphragm assembly (2) are identical, and for different ones of the magnet assemblies (3), magnetic polarities of ends of the inner magnets (32) that are adjacent to the vibration diaphragm assembly (2) are identical.

5. The planar diaphragm speaker according to claim 1, wherein the vibration diaphragm (21) divides an internal space of the enclosure (1) into a front compartment space (111) and a rear compartment space (121);

a pad (4) is arranged in the front compartment space (111);

the pad (4) comprises a top face and a bottom face that are opposite to each other and a lateral face connecting between the top face and the bottom face, the top face being positioned against an internal surface of the enclosure (1), the lateral face being arranged to separate from the internal surface of the enclosure (1), the bottom face being simultaneously in contact with the inner magnet (32) and the outer magnet (31) adjacent thereto.

6. The planar diaphragm speaker according to claim 5, wherein the pad (4) partly covers the magnetic gap (33), so that the magnetic gap (33) is in communication with a space between the lateral face of the pad (4) and the internal surface of the enclosure (1).

7. The planar diaphragm speaker according to claim 6, wherein the inner magnet (32) is in the form of a strip, and the outer magnet (31) is a magnet having a rectangular ring shape;

a length of the pad (4) is less than or equal to a length of the inner magnet (32), and a width of the pad (4) is greater than a width of an internal hole of the outer magnet (31) and is less than a width of the outer magnet (31).

8. The planar diaphragm speaker according to claim 5, wherein a sidewall of the enclosure (1) is formed with a front-compartment sound outlet opening (1111) in communication with the front compartment space (111), the front-compartment sound outlet opening (1111) being arranged at one side of the pad (4) and not blocked by the magnet assemblies (3); and the sidewall of the enclosure (1) is formed with a rear-compartment sound outlet opening (1211) in communication with the rear compartment space.

9. The planar diaphragm speaker according to claim 8, wherein the enclosure (1) comprises a top wall and a bottom wall that are opposite to each other and a sidewall connecting between the top wall and the bottom wall, the sidewall comprising two opposite long-side sidewalls and two opposite short-side sidewalls, each of the long-side sidewalls being connected to the two short-side sidewalls adjacent thereto, lengthwise dimensions of the long-side sidewalls being greater than widthwise dimensions of the short-side sidewalls, height-wise dimensions of the long-side sidewalls being equal to height-wise dimensions of the short-side sidewalls;

the vibration diaphragm assembly (2) is parallel to the top wall and are perpendicular to the four sidewalls; and the front-compartment sound outlet opening (1111) and the rear-compartment sound outlet opening (1211) are respectively formed in the two opposite short-side sidewalls.

10. The planar diaphragm speaker according to claim 1, wherein the magnetic gap (33) is greater than or equal to 0.05 mm and is less than or equal to 0.15 mm.

11. The planar diaphragm speaker according to claim 1, wherein the vibration diaphragm (21) comprises a film (211), a rigid plate (212), and a film ring (213) that are sequentially stacked on each other, the trough (2121) being formed in the rigid plate (212); and the voice coil (22) and the film ring (213) are located on a same side of the rigid plate (212).

12. The planar diaphragm speaker according to claim 11, wherein the film (211) is formed, in one end thereof that is close to an adjacent one of the magnet assemblies (3), in an integrated form, with a bent ring (2111), the bent ring (2111) projecting in a direction that is identical a direction in which the trough (2121) is recessed.

13. The planar diaphragm speaker according to claim 11, wherein a gasket ring is arranged between the vibration diaphragm assembly and each of the magnet assemblies adjacent thereto, thicknesses of the gasket rings plus with a thickness of the film ring define a height of a vibration compartment within which the vibration diaphragm assembly is accommodated.

14. The planar diaphragm speaker according to claim 13, wherein the vibration diaphragm divides an internal space of the enclosure into a front compartment space and a rear compartment space;

the enclosure comprises a sidewall which is formed with a rear-compartment sound outlet opening;

the rear-compartment sound outlet opening is arranged at one side of the gasket ring; and the gasket ring is formed with a notch to allow the rear-compartment sound outlet opening to be in communication with the rear compartment space.

15. The planar diaphragm speaker according to claim 1, wherein a gap between the voice coil (22) and an adjacent one of the magnet assemblies (3) is greater than or equal to 0.1 mm and less than or equal to 0.2 mm.

* * * * *